United States Patent
Bell et al.

(10) Patent No.: US 6,328,458 B1
(45) Date of Patent: *Dec. 11, 2001

(54) SUPPORT ARM FOR SURGICAL LIGHT APPARATUS

(75) Inventors: William R. Bell; Dennis C. Coon; Thomas M. Peterson, all of Erie, PA (US)

(73) Assignee: Hill-Rom Services, Inc., Batesville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/480,640

(22) Filed: Jan. 11, 2000

Related U.S. Application Data

(63) Continuation-in-part of application No. 09/050,530, filed on Mar. 30, 1998, now Pat. No. 6,012,821.

(51) Int. Cl.$^7$ .................................................. F21V 21/26

(52) U.S. Cl. ........................ 362/371; 362/288; 362/402; 362/427; 362/804; 403/117; 403/150

(58) Field of Search .............................. 362/33, 287–289, 362/418, 419, 401, 402, 422, 427, 428, 804; 248/280.11, 292.11, 292.13, 292.14, 325, 585, 586; 403/65, 112, 116, 117, 150, 154, 156, 157

(56) References Cited

U.S. PATENT DOCUMENTS

| | | | |
|---|---|---|---|
| 2,911,519 | 11/1959 | Phillips et al. | 362/272 |
| 2,941,776 | 6/1960 | Lauterbach | 248/280.11 |
| 3,010,013 | 11/1961 | Gunther et al. | 362/147 |
| 3,240,925 | 3/1966 | Paschke et al. | 362/33 |
| 3,360,640 | 12/1967 | Seitz et al. | 362/12 |
| 3,584,793 | 6/1971 | Ilzig et al. | 362/427 |
| 3,783,262 | 1/1974 | Pile | 362/184 |
| 3,820,752 | 6/1974 | Oram | 248/284.1 |
| 3,936,671 | 2/1976 | Bobrick et al. | 362/459 |
| 4,032,775 | 6/1977 | Bobrick et al. | 362/426 |
| 4,080,530 | 3/1978 | Krogsrud | 362/402 |
| 4,082,244 | 4/1978 | Groff | 248/280.11 |
| 4,097,919 | 6/1978 | Bobrick et al. | 362/270 |
| 4,107,769 | 8/1978 | Saluja | 362/402 |
| 4,130,858 | 12/1978 | Hayakawa | 362/150 |
| 4,160,536 | 7/1979 | Krogsrud | 248/280.11 |
| 4,166,602 | 9/1979 | Nilsen et al. | 248/280.11 |

(List continued on next page.)

FOREIGN PATENT DOCUMENTS

| | | |
|---|---|---|
| 1112023 | 8/1961 | (DE) . |
| 83 09 857.7 | 11/1986 | (DE) . |
| 37 14 637 | 12/1988 | (DE) . |
| 0 508 178 A1 | 10/1992 | (EP) . |

OTHER PUBLICATIONS

Berchtold Corporation, "Chromophare® C–571 Superior lighting technology is the secret of our success", Feb. 1995, 8 pages.

Berchtold Corporation, "Chromophare® C–570 Service Manual", date unknown, 20 pages.

*Primary Examiner*—Alan Cariaso
(74) *Attorney, Agent, or Firm*—Barnes & Thornburg

(57) ABSTRACT

An arm assembly for supporting a surgical lighthead of a surgical light apparatus. The arm assembly includes a first arm and a second arm pivotally coupled to the first arm about a main pivot axis. A rod extends within an interior region of the second arm. A link is coupled to the rod to the first arm for pivoting movement about a link pivot axis that is spaced apart from the main pivot axis. A spring extends within the interior region of the second arm. The spring exerts a force on the rod and the link to counterbalance the surgical lighthead. A space filler includes an outer cover coupled to the first arm and formed to include a first slot and an inner cover nested within the outer cover and formed to include a second slot.

39 Claims, 7 Drawing Sheets

U.S. PATENT DOCUMENTS

| | | | |
|---|---|---|---|
| 4,390,932 | 6/1983 | Matsui et al. | 362/269 |
| 4,494,177 | 1/1985 | Matthews | 362/402 |
| 4,517,632 | 5/1985 | Roos | 362/389 |
| 4,523,732 | 6/1985 | Biber et al. | 248/123.11 |
| 4,692,849 * | 9/1987 | Le Vantine | 362/402 |
| 4,744,019 | 5/1988 | Krogsrud | 362/402 |
| 4,770,384 | 9/1988 | Kuwazima et al. | 248/281.11 |
| 4,846,434 | 7/1989 | Krogsrud | 248/284.1 |
| 5,025,359 | 6/1991 | Saluja et al. | 362/402 |
| 5,038,261 | 8/1991 | Kloos | 362/286 |
| 5,186,337 | 2/1993 | Foster et al. | 211/26 |
| 5,277,427 * | 1/1994 | Bryan et al. | 403/157 |
| 5,340,072 | 8/1994 | Halbirt | 248/279 |
| 5,348,260 | 9/1994 | Acevedo | 248/280.11 |
| 5,618,090 | 4/1997 | Montague et al. | 312/209 |
| 6,012,821 * | 1/2000 | Yeaney et al. | 362/33 |

* cited by examiner

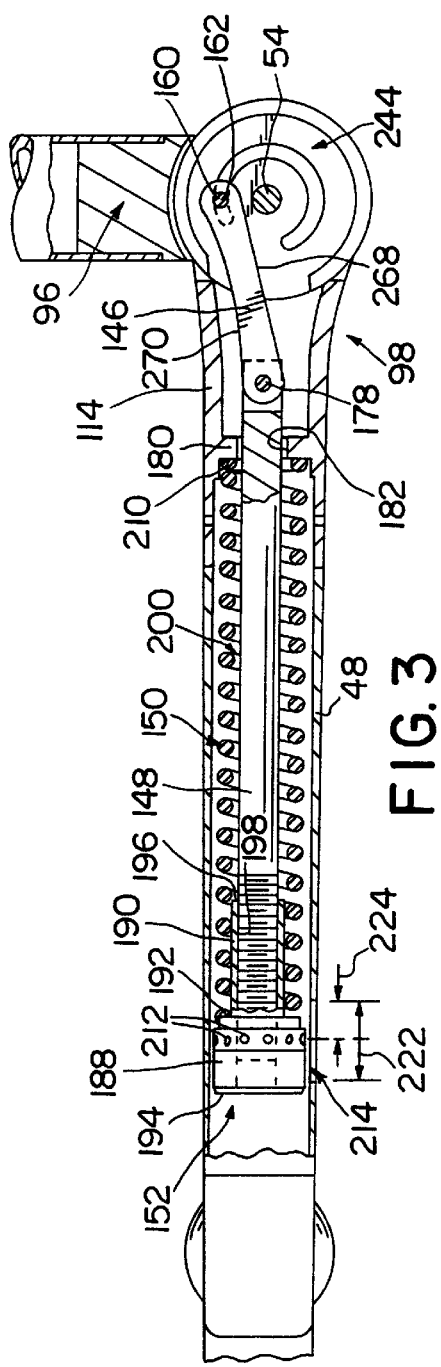
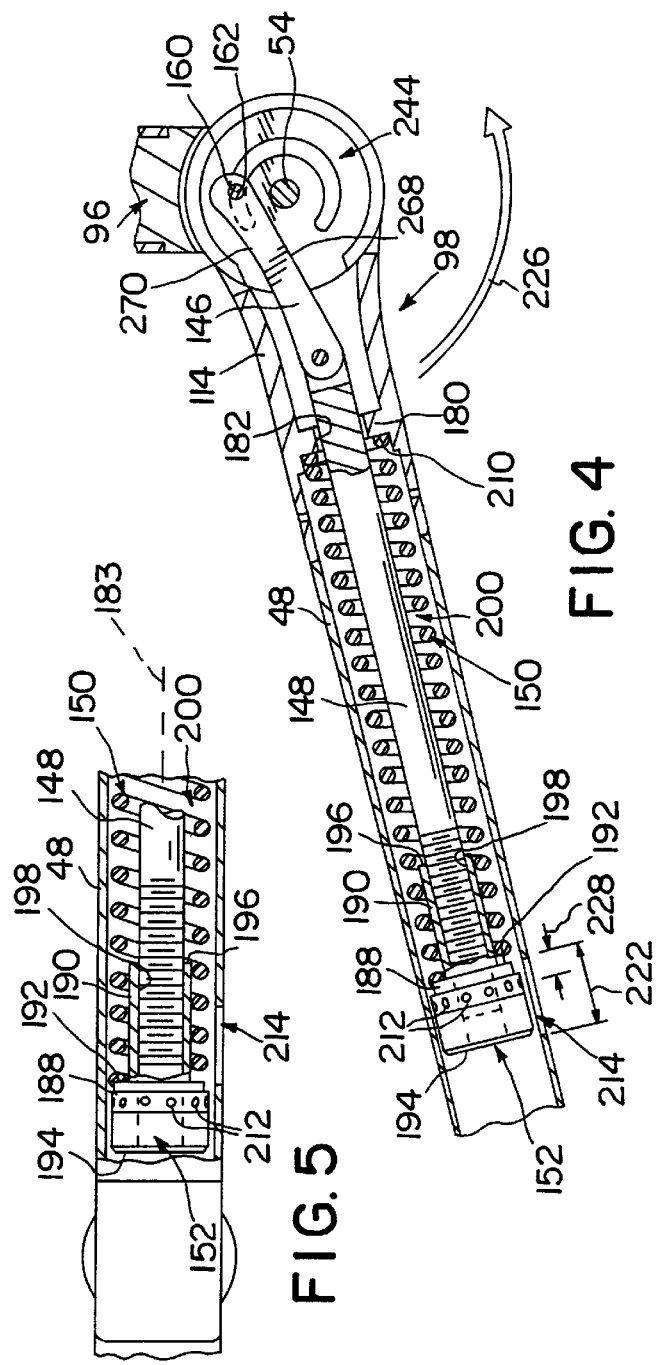

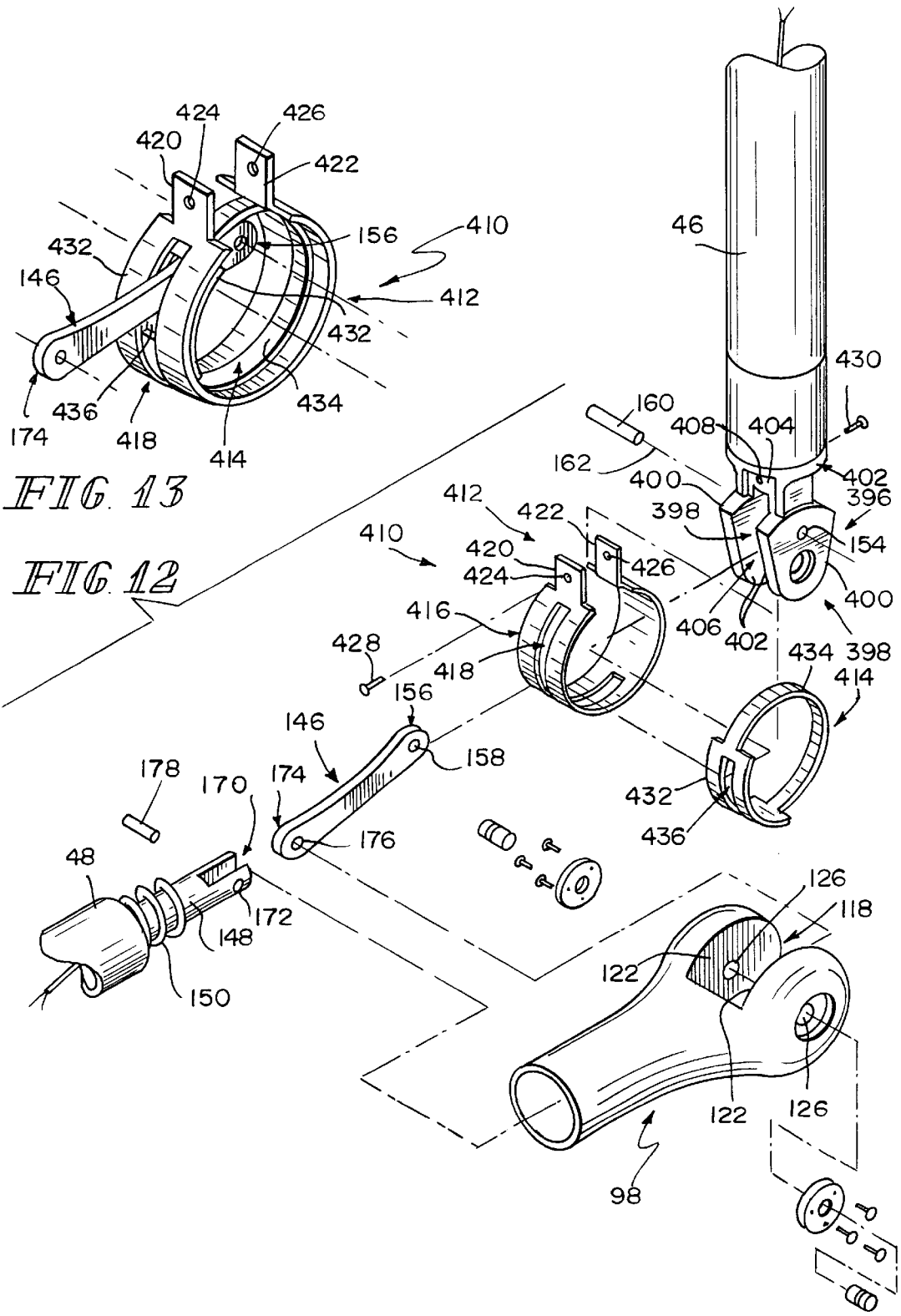

SUPPORT ARM FOR SURGICAL LIGHT APPARATUS

This application is a continuation-in-part of U.S. application Ser. No. 09/050,530, filed Mar. 30, 1998, now U.S. Pat. No. 6,012,821.

BACKGROUND AND SUMMARY OF THE INVENTION

The present invention relates to a surgical light apparatus, and particularly, to a support arm for the surgical light apparatus. More particularly, the present invention relates to a jointed support arm that permits movement of a lighthead of the surgical light apparatus to various positions and that counterbalances the weight of the surgical lighthead.

Surgical lights used in hospital operating rooms to illuminate surgical sites on patients are known. Many surgical lights include a surgical lighthead containing a light source and an arm mechanism configured to support the surgical lighthead relative to a ceiling of the operating room. Such arm mechanisms typically include one or more joints which allow the surgical lighthead to be moved in plural degrees of freedom within the operating room various positions so that the light source of the surgical light illuminates a surgical site on a patient in a desired manner. It is desirable for the arm mechanism of the surgical light to counterbalance the associated surgical lighthead when the surgical lighthead is at any position within a range of positions.

According to the present invention, an arm assembly for supporting a surgical lighthead of a surgical light apparatus includes a first arm and a first clevis appended to the first arm. The first clevis has a pair of separated first flanges. The first clevis further includes a first stop surface and a second stop surface. The arm assembly includes a second arm which is formed to include an interior region. The surgical lighthead is supported by the second arm. A second clevis is appended to the second arm and has a pair of separated second flanges. The second clevis further includes a third stop surface and a fourth stop surface.

A pair of pivot pins pivotably couple each of the pair of second flanges to a respective one of the first flanges so that the second arm and second clevis are pivotable about a main pivot axis relative to the first arm and first clevis. The pivot pins are spaced apart to define a gap therebetween. A rod extends within the interior region of the second arm. The arm assembly includes a link coupled to the rod and pivotably coupled to the first clevis for pivoting movement about a link pivot axis that is spaced apart from the main pivot axis. A spring extends within the interior region of the second arm and exerts a force on the rod and the link to counterbalance the surgical lighthead.

The arm assembly is configured so that the second arm and second clevis are pivotable about the main pivot axis relative to the first arm and first clevis between a first position in which the third stop surface engages the first stop surface to limit pivoting movement of the second clevis and second arm in a first direction and a second position in which the fourth stop surface engages the second stop surface to limit pivoting movement of the second clevis and second arm in a second direction. The link moves into the gap between the pair of pivot pins during movement of the second arm and second clevis between the first position and the second position.

In preferred embodiments, the arm assembly includes an adjuster mounted on the rod. The adjuster includes a spring-engaging portion that engages the spring to compress the spring against the second clevis. The adjuster is movable to change the force exerted by the spring on the rod and the link to counterbalance the surgical lighthead. Also in preferred embodiments, the arm assembly includes a space filler that is positioned to lie between the first flanges of the first clevis. The space filler includes a rim that spans the space between the first flanges. In addition, the rim of the space filler cooperates with the first flanges to span the space between the second flanges of the second clevis.

Additional features and advantages of the present invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 3 is a side elevation view of the first arm mechanism of FIG. 2, with portions broken away, showing the counterbalancing mechanism including a coil spring extending within an interior region of the second arm, a rod extending through the coil spring within the interior region of the second arm, a link having one end pivotably coupled to one end of the rod and having another end pivotably coupled to the first clevis, and an adjuster bolt threadedly coupled to another end of the rod, the adjuster bolt including a plurality of small holes that are accessible through a window formed in the second arm;

FIG. 4 is a side elevation view similar to FIG. 3 showing the second arm and second clevis pivoting in the direction of the double arrow relative to the first clevis, the rod moving relative to the second arm as the second arm and second clevis pivot in the direction of the double arrow so that the spring is further compressed between the adjuster bolt and a shoulder of the second clevis;

FIG. 5 is a side elevation view of a portion of the second arm in a horizontal position showing the adjuster bolt adjusted relative to the rod such that the small holes of the adjuster bolt are inaccessible through the window in the arm and such that the small holes would become accessible through the window in the second arm if the second arm were pivoted downwardly away from the horizontal position by a sufficient amount;

FIG. 12 is an exploded perspective view of another embodiment of the present invention illustrating another embodiment of a space filler apparatus including a fixed outer cover and a movable inner cover;

FIG. 13 is a perspective view of the space filler of FIG. 12 illustrating the position of the inner cover within the outer cover with a link of the support arm extending through slots formed in the inner and outer covers;

DETAILED DESCRIPTION OF THE DRAWINGS

Figure 1:
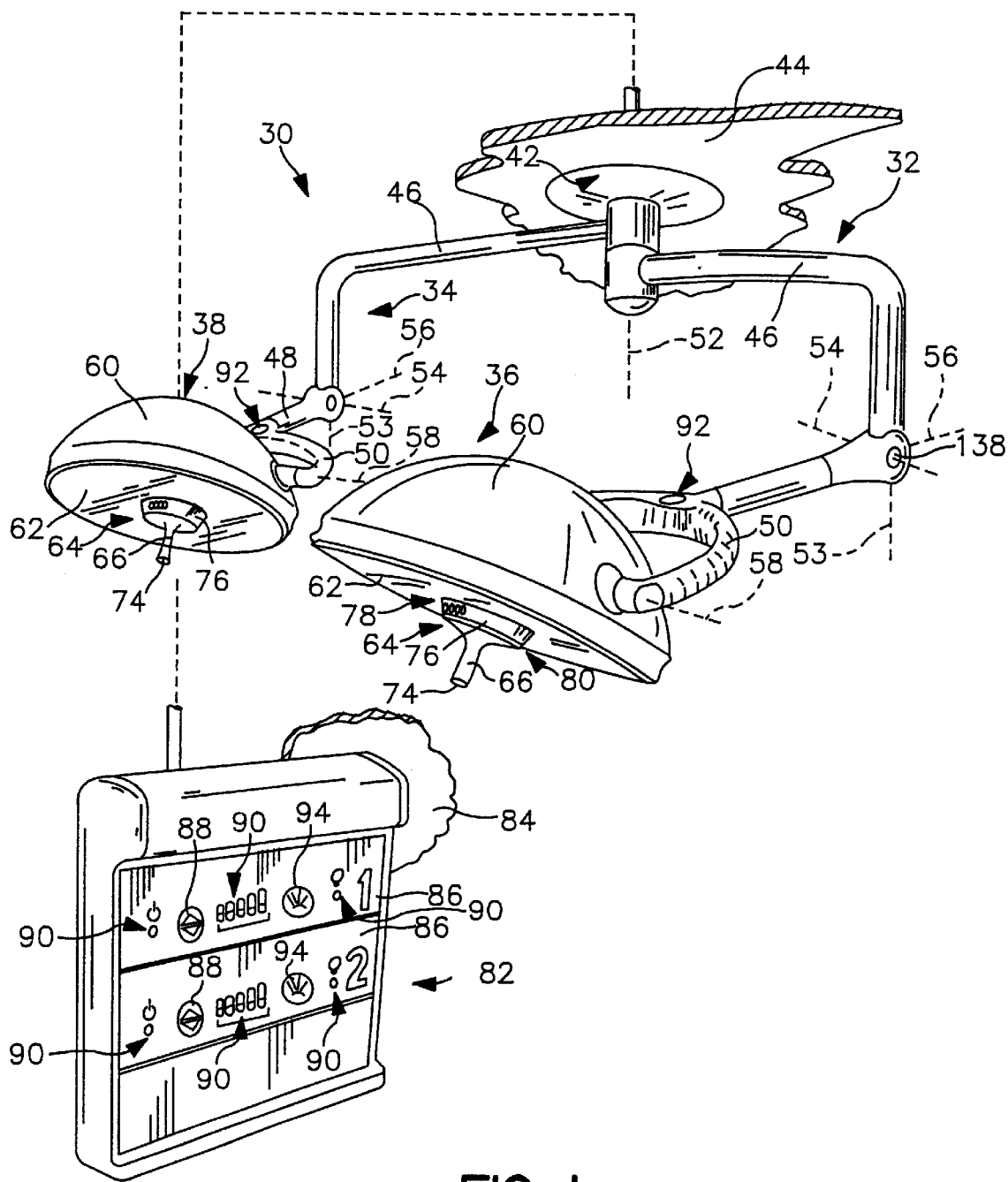
FIG. 1 is an isometric view of a surgical light apparatus in accordance with the present invention showing a first surgical lighthead suspended from a ceiling of a hospital room by a first arm assembly, a second surgical lighthead suspended from the ceiling of the hospital room by a second arm assembly, and a light-controller box mounted to a wall of the hospital room.

A surgical light apparatus 30 includes a first arm assembly 32, a second arm assembly 34, a first lighthead 36 coupled to first arm assembly 32, and a second lighthead 38 coupled to second arm assembly 34 as shown in FIG. 1. First and second arm assemblies 32, 34 each couple to a common mounting apparatus 42 which is configured to mount to a suitable support structure (not shown) associated with a ceiling 44. Each arm assembly 32, 34 includes an L-shaped upper or first arm 46, a lower or second arm 48, and a yoke 50. Each first arm 46 is independently pivotable relative to mounting apparatus 42 about a vertical pivot axis 52. Each second arm 48 is pivotable relative to the respective first arm 46 about a respective horizontal or main pivot axis 54 and about a respective vertical pivot axis 53 that is spaced from pivot axis 52. In addition, each yoke 50 is pivotable relative to the respective second arm 48 about a respective pivot axis 56 and each of lightheads 36, 38 is pivotable relative to the respective yoke 50 about a respective pivot axis 58. Thus, arm assemblies 32, 34 and lightheads 36, 38 are movable to a variety of positions relative to ceiling 44.

Each lighthead 36, 38 includes a dome-shaped housing 60, a lens 62 through which light shines from the respective lighthead 36, 38, and a handle assembly 64 as shown in FIG. 1. Each handle assembly 64 includes a handle 66 which is grasped by a surgeon to move the respective lighthead 36, 38 and associated arm assembly 32, 34 to a desired position. Each lighthead 36, 38 includes one or more light bulbs (not shown) and each lighthead 36, 38 includes a reflector (not shown) that reflects light emanating from the at least one light bulb to illuminate a surgical site on a patient. Each lighthead 36, 38 also includes a light absorption filter (not shown) that is fabricated from specially formulated glass to filter most of the near and intermediate infra-red emissions from the at least one light bulb.

Handle 66 of each handle assembly 64 is rotatable to move the at least one light bulb relative to the reflector to adjust the pattern size of reflected light that illuminates the surgical site. The pattern size may be thought of generally as the diameter of the area illuminated by the associated lighthead 36, 38. In addition, handle assembly 64 includes a button 74 at the bottom of handle 66 which is pressed to adjust the intensity level at which light emanates from the at least one light bulb. Handle assembly 64 includes an escutcheon 76 above handle 66. Handle assembly 64 further includes a first set of LED's 78 and a second set of LED's 80 that are visible on respective sides of escutcheon 76 to provide user information regarding the operation of the at least one light bulb and the intensity level at which light is emanating from the at least one light bulb. In preferred embodiments, each of the at least one light bulb is a tungsten halogen lamp.

Surgical light apparatus 30 includes a controller box 82, shown in FIG. 1, which is mounted to a wall 84 or other suitable structure and which is coupled electrically to surgical lightheads 36, 38 to control the operation of the at least one light bulb. Controller box 82 includes a control panel 86 having buttons 88 and sets of LED's 90 that are associated with each respective lighthead 36, 38. Each set of LED's 90 is arranged similarly and provides the same information as LED's 78, 80 of the respective lighthead 36, 38. In addition, each button 86 is pressed to change the light intensity of the at least one light bulb in the same manner that button 74 of the associated lighthead 36, 38 is pressed to change the light intensity of the at least one light bulb. Thus, the operation of the at least one light bulb is controllable either with the respective handle assembly 64 or controller box 82. Surgical light apparatus 30 optionally may include a task light 92, shown in FIG. 1, and controller box 82 optionally may include a button 94 that is pressed to turn task light 92 on and off.

The description below of first arm assembly 32 and the operation of first arm assembly 32 applies as well to second arm assembly 34 and the operation of second arm assembly 34 unless specifically noted otherwise. In addition, although surgical light apparatus 30 includes two arm assemblies 32, 34 and two lightheads 36, 38 as shown in FIG. 1, it is within the scope of the invention as presently perceived for a different number of an assemblies and corresponding lightheads to be provided. For example, a surgical light apparatus having only one arm assembly and one corresponding lighthead and a surgical light apparatus having three or more arm assemblies and three or more corresponding lightheads are possible.

Figure 2:
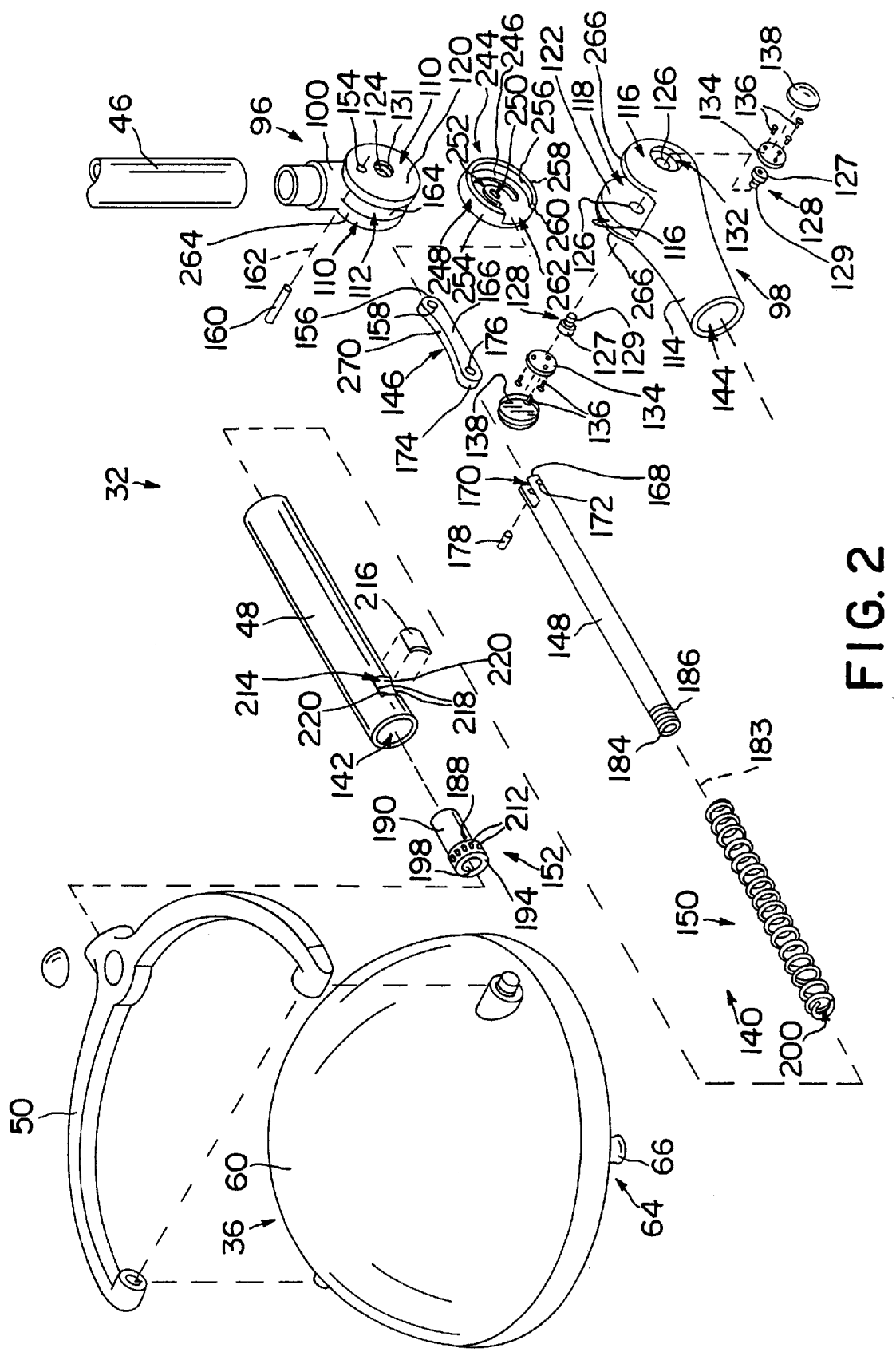
FIG. 2 is an exploded view of the first arm assembly of FIG. 1 showing a vertically extending first arm, a first clevis arranged for attachment to a bottom portion of the first arm, a second clevis arranged for attachment to the first clevis by a pair of pivot pins, a yoke arranged for attachment to the first surgical lighthead, a tubular second arm having a first end that attaches to the yoke and a second end that attaches to the second clevis, and components of a counterbalancing mechanism arranged for insertion into respective interior regions of the second arm and second clevis.

Arm assembly 32 includes first arm 46 and second arm 48 as previously described. Arm assembly 32 further includes a first clevis 96 that attaches or otherwise appends to first arm 46 and a second clevis 98 that attaches or otherwise appends to second arm 48 as shown, for example, in FIGS. 2 and 3. First clevis 96 includes a main body 100 and a pair of flanges 110 appended to main body 100 and extending therefrom in parallel relation so as to define a space 112 therebetween as shown in FIG. 2. Second clevis 98 includes a main body 114 and a pair of flanges 116 appended to main body 114 and extending therefrom in parallel relation so as to define a space 118 therebetween. Space 118 is larger than space 112.

Flanges 110 of first clevis 96 are received in space 118 of second clevis 98 and flanges 110 each include an outer side face 120 that confronts a respective inner side face 122 of flanges 116 such that a minimal amount of clearance exists between side faces 120, 122. Flanges 110 each include a main aperture 124 and flanges 116 each include a main aperture 126 as shown in FIG. 2. A pair of pivot pins 128 are received by apertures 124, 126 to pivotably couple flanges 116 of second clevis 98 to respective flanges 110 of first clevis 96. Pivot pins 128 are spaced apart from one another such that a portion of space 112 defines a gap 130 between pivot pins 128 as shown best in FIG. 8.

In preferred embodiments, apertures 124 formed in flanges 110 of clevis 96 are threaded and apertures 126 formed in flanges 116 of clevis 98 are smooth. In addition, each pivot pin 128 includes an enlarged head portion 127 received in a respective aperture 126 and a threaded portion 129 received in a respective aperture 124. Apertures 124 are smaller in diameter than apertures 126 so that when pivot pins are threaded into apertures 124, head portions 127 engage a shoulder surface 131 of the respective flange 110. As second clevis 98 and second arm 48 pivot about main pivot axis 54, pivot pins 128 remain stationary along with flanges 110 of first clevis 96 while flanges 116 of second clevis 98 rotate relative to enlarged head portions 127 of pivot pins 128. Pivot pins 128, therefore, cooperate with apertures 126 to define main pivot axis 54 about which second clevis 98 and second arm 48 rotate. Each flange 116 is formed to include a recess 132, shown in FIG. 2, and arm assembly 32 includes a pair of cover plates 134 that are received in respective recesses 132 and that are fastened to the respective flange 116 by suitable fasteners, such as screws 136. Arm assembly 32 further includes a pair of cosmetic caps 138, shown in FIGS. 1, 2 and 8, that are received in respective recesses 132 to shield respective cover plates 134 and screws 136 from view.

Second arm 48 is a tubular member having an interior region 142 and second clevis 98 is formed to include an interior region 144 that extends through main body 114 into communication with space 118. Second arm 48 attaches to second clevis 98 such that interior region 142 communicates with interior region 144. Arm assembly 32 includes a counterbalancing assembly 140 that operates to counterbalance lighthead 32 so that lighthead 32 remains stationary after placement in a desired position. Respective portions of counterbalancing assembly 140 are positioned to lie in interior regions 142, 144 so as to be shielded from view by second arm 48 and second clevis 98.

Counterbalancing assembly 140 includes a link 146, a rod 148, a spring 150, and an adjuster 152 as shown best in FIG. 2. Flanges 110 of first clevis 96 are each formed to include an aperture 154 that is spaced apart from and vertically above the respective main aperture 124. Link 146 includes a first end 156 formed with an aperture 158. Counterbalancing assembly 140 further includes a pivot pin 160 that is received by apertures 154 of flanges 110 and aperture 158 formed in first end 156 of link 146. Thus, pivot pin 160 couples link 146 to first clevis 96 for pivoting movement about a link pivot axis 162 defined by pivot pin 160. Each flange 110 of first clevis 96 includes an inner face 164 and link 146 includes a pair of vertical faces 166. First end 156 of link 146 is positioned to lie between inner faces 164 of flanges 110 such that a portion of each vertical face 166 faces toward a respective inner face 164 of the associated flange 110.

Link 146 extends out of space 112 and away from first clevis 96 into interior region 144 of main body 114 of second clevis 98 as shown, for example, in FIGS. 3 and 4. Rod 148 includes a first end face 168 formed with a slot 170 therein as shown in FIG. 2. Rod 148 is formed to include a pair of apertures 172 adjacent to first end face 168. Each aperture 172 communicates with slot 170. Link 146 includes a second end 174 formed with an aperture 176. Second end 174 of link 146 is positioned to lie in slot 170 formed in rod 148 and counterbalancing assembly 140 includes a pivot pin 178 received in apertures 172 or rod 148 and aperture 176 of link 146 to pivotably couple link 146 to rod 148.

Rod 148 extends from link 146 through interior region 144 of main body 114 of second clevis 98 into interior region 142 of second arm 48 as shown in FIGS. 3 and 4. Thus, one portion of rod 148 extends within interior region 144 of second clevis 98 and another portion of rod 148 extends within interior region 142 of second arm 48. Second clevis 98 includes an annular shoulder 180 having a journal aperture 182 formed therethrough as also shown in FIGS. 3 and 4. Journal aperture 182 is sized so that a minimal amount of clearance exists between shoulder 180 and rod 148.

As second arm 48 and second clevis 98 pivot about main axis 54, link 146 pivots about link pivot axis 162 relative to first clevis 96 and pivots about pivot pin 178 relative to rod 148. Pivoting movement of link 146 causes rod 148 to move within journal aperture 182 relative to shoulder 180. Annular shoulder 180 is configured so that rod 148 is supported relative to second arm 48 in substantially coaxial relation therewith and so that a longitudinal axis 183 of rod 148 extends through main pivot axis 54 in perpendicular relation therewith. In alternative embodiments, a separate bushing (not shown) may be mounted in journal aperture 182 of shoulder 180 to support rod 148 and to guide movement of rod 148 relative to shoulder 180.

Rod 148 includes a second end face 184 that faces away from second clevis 98 as shown in FIG. 2. In addition, rod 148 is formed with a thread or threads 186 adjacent to second end face 184. Adjuster 152 includes a spring-engaging portion 188 and a rod-engaging portion 190 appended to spring-engaging portion 188 and extending axially therefrom toward first and second devises 96, 98. Spring-engaging portion 188 of adjuster 152 includes a spring-engaging surface 192, shown in FIGS. 3–5, that faces toward first and second clevises 96, 98 and an end surface 194, shown in FIGS. 2–5, that faces away from first and second devises 96, 98. In addition, rod-engaging portion 190 includes an end surface 196 that faces toward first and second clevis 96, 98 as shown in FIGS. 3–5. Adjuster 152 includes a threaded bore 198 extending therethrough between end surfaces 194, 196. Adjuster 152 is threadedly coupled to rod 148 so that threads 186 of rod 148 engage threaded bore 198 of adjuster 152.

In preferred embodiments, spring 150 is a coil spring defining an interior region 200 and rod 148 extends through interior region 200 of spring 150. In addition, rod-engaging portion 190 of adjuster 152 is received in interior region 200 of spring 150 as shown in FIGS. 3–5. Shoulder 180 includes a spring-engaging surface 210 as shown in FIGS. 3 and 4. Spring 150 is compressed between spring-engaging surface 192 of adjuster 152 and spring-engaging surface 210 of shoulder 180. Thus, spring 150 acts between shoulder 180 and adjuster 152 to exert a force on rod 148 and link 146 to counterbalance lighthead 36. In addition, adjuster 152 is rotatable relative to rod 148 to change the amount by which spring 152 is compressed between spring-engaging surfaces 192, 210 thereby to change the amount of force exerted by spring 150 on rod 148 and link 146. In alternative embodiments, arm mechanism 32 may include a tubular liner (not shown) that extends between shoulder 180 and adjuster 152 and that surrounds spring 150 to take up some of the circumferential clearance between spring 150 and second arm 48 to facilitate the coaxial positioning of spring 150 relative to second arm 48.

Each of spring-engaging portion 188 and rod-engaging portion 190 of adjuster 152 are somewhat cylindrical in shape and adjuster 152 is configured such that a minimal amount of clearance exists between spring-engaging portion 188 and second arm 48. Spring-engaging portion 188 of adjuster 152 is formed to include a plurality of radially extending holes 212 and second arm 48 is formed to include a window 214, shown, for example, in FIG. 2, which allows access to adjuster 152. Arm assembly 32 includes a cover plate 216 that attaches to second arm 48 to cover window 214. When cover plate 216 is detached from second arm 48, an adjustment tool (not shown), such as a straight rod, is inserted though window 214 and into one of holes 212. The adjustment tool is then moved within window 214 to apply a torque to adjuster 152 to rotate adjuster 152 relative to rod 148. Whether adjuster 152 advances on threads 186 of rod 148 toward first and second clevis 96, 98 or away from first and second devises 96, 98 is dependent upon the direction that the adjustment tool is moved within window 214.

In preferred embodiments, window 214 is bounded by a pair of spaced apart, axially extending edges 218 and a pair of spaced apart, circumferentially extending edges 220 as shown best in FIG. 2. The spacing between edges 218 limits the amount by which adjuster 152 may be rotated relative to rod 148 during any one stroke of the adjustment tool between edges 218. In addition, the spacing between edges 220, which is indicated by reference numeral 222 in FIGS. 3 and 4, limits the amount by which adjuster 152 is movable toward and away from first and second devises 96, 98.

It will be understood that, although edges 220 are spaced apart by distance 222, adjuster 152 is movable relative to rod 148 between first and second axial positions (not shown) that are spaced apart by an amount that exceeds distance 222. This is due to the fact that, as second clevis 98 and second arm 48 pivot about main pivot axis 54, rod 148 and adjuster 152 are moved relative to second arm 148 by link 146 such that the distance between holes 212 and each of edges 220 varies. For example, an arbitrary position of adjuster 152 relative to rod 148 is shown in FIGS. 3 and 4. When second arm 48 is in a horizontal orientation, as shown in FIG. 3, holes 212 are spaced apart from the edge 220 closest to first and second clevises 96, 98 by a distance 224. As second clevis 98 and second arm 48 rotate about main pivot axis 54 in the direction of double arrow 226, shown in FIG. 4, rod 148 is pulled by link 146 through journal aperture 182 such that spring 150 is further compressed between spring-engaging surfaces 192, 210 and such that the distance between holes 212 and the edge 220 closest to first and second devises 96, 98 decreases. Thus, when second clevis 98 and second arm 48 are in the position shown in FIG. 4, holes 212 are spaced from the edge 220 closest to first and second devises 96, 98 by a distance 228 which is smaller than distance 224.

When second clevis 98 and second arm 48 are held in the position shown in FIG. 4, the adjustment tool may be used to rotate adjuster 152 relative to rod 148 such that holes 212 move away from the edge 220 closest to first and second clevises 96, 98 and toward the edge 220 furthest from first and second clevises 96, 98. After adjuster 152 is adjusted relative to rod 148 in this manner and after second clevis 98 and second arm 48 are moved upwardly, for example, to a horizontal position, as shown in FIG. 5, holes 212 are no longer accessible through window 214. Of course, holes 212 become accessible through window 214 when second arm 48 is pivoted downwardly from the horizontal position of FIG. 5 back to the position of FIG. 4.

It will be understood that adjuster 152 may be moved to a position on rod 148 such that holes 212 are accessible through window 214 when second arm 48 is in the horizontal position, shown in FIG. 3, and such that holes 212 are inaccessible through window 214 when second arm 48 is moved downwardly, for example, to the position shown in FIG. 4. Thus, by articulating second arm 48 and second clevis 98 relative to first arm 46 and first clevis 96 and by using the adjustment tool to make appropriate adjustments of adjuster 152 relative to rod 148 when holes 212 are accessible through window 212, adjuster 152 is movable axially on rod 148 by an amount that exceeds distance 222.

Movement of adjuster 152 relative to rod 148 alters the amount by which spring 150 is compressed between spring-engaging surface 192 of adjuster 152 and spring-engaging surface 210 of shoulder 180. In use, adjuster 152 is moved to a position relative to rod 148 such that surgical lighthead 36, yoke 50, second arm 48, second clevis 98, counterbalancing assembly 140, and other associated components of surgical light apparatus 30 are counterbalanced to remain stationary when placed in any desired position within a range of positions. Counterbalancing assembly 140 is configured so that second end face 184 of rod 148 is positioned to lie inside threaded bore 198 of adjuster 152 between end surfaces 194, 196.

By configuring adjuster 152 such that second end face 184 of rod 148 is never in a position between end face 194 of adjuster 152 and yoke 50, second arm 48 has a length that allows yoke 50 and lighthead 34 to be closer to main pivot axis 54 than would otherwise be possible if rod 148 were able to extend from adjuster 152 such that second end face 184 of rod 148 were positioned to lie between adjuster 152 and yoke 50. Having yoke 50 and lighthead 36 closer to main pivot axis 54 reduces the moment created by yoke 50 and lighthead 36 about main pivot axis 54 which means that counterbalancing assembly 140 is able to counterbalance yoke 50 and lighthead 36 with a smaller, and therefore less expensive, spring than would be the case if yoke 54 and lighthead 36 were further from main pivot axis 54.

In preferred embodiments, spring 150 is made of chrome silicon ASTM A401 material and has a spring rate of approximately three-hundred-fifty pounds per inch. In addition, the ends of spring 150 are ground so as to abut respective spring-engaging surfaces 192, 210 flushly. In preferred embodiments, link 146 and adjuster 152 are both made of 4140 steel material, rod 148 is made of 4130 steel material, and inner and outer devises 96, 98 are each cast from aluminum. Of course, it is within the scope of the invention as presently perceived for these elements to be fabricated from other materials of suitable strength.

Figure 6:
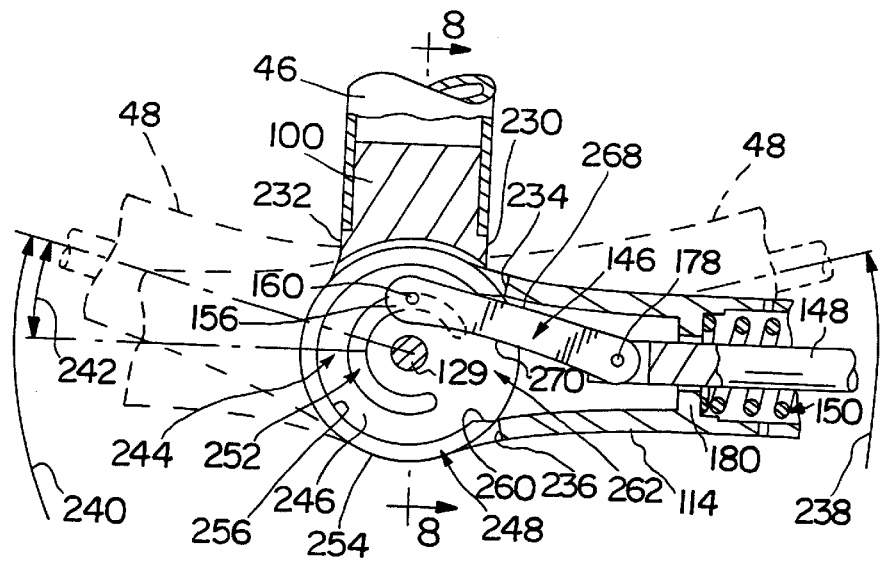
FIG. 6 is a side elevation view of a portion of the first arm mechanism showing the second arm and second clevis in a horizontal position (in solid), the second arm and second clevis being pivotable from the solid-link horizontal position in a counterclockwise direction to a first position (in phantom) in which a stop edge of the second clevis engages an associated stop edge of the first clevis, and the second arm and second clevis being pivotable from the solid-line horizontal position in a clockwise direction through another horizontal position (in phantom) into a second position (in phantom) in which another stop edge of the second clevis engages an associated stop edge of the first clevis.

Arm mechanism 32 is configured such that, in one preferred embodiment, second clevis 98 and second arm 48 are pivotable about main pivot axis 54 between first and second positions through a range of motion that exceeds one-hundred-eighty degrees. Main body 100 of first clevis 96 is formed to include a first stop surface 230 and a second stop surface 232 as shown in FIG. 6. In addition, main body 114 of second clevis 98 is formed to include a third stop surface 234 and a fourth stop surface 236 as also shown in FIG. 6. When second clevis 98 and second arm 48 are in the first position, third stop surface 234 engages first stop surface 230 and when second clevis 98 and second arm 48 are in the second position, fourth stop surface 236 engages second stop surface 232.

Engagement between stop surfaces 230, 234 prevents clevis 98 and second arm 48 from pivoting, upwardly past the first position in the direction of arrow 238 and engagement between stop surfaces 232, 236 prevents clevis 98 and second arm 48 from pivoting upwardly past the second position in the direction of arrow 240. When second clevis 98 and second arm 48 are in the first position, second arm 48 extends at an angle of approximately fifteen degrees above horizontal on one side of first clevis 96 and when second clevis 98 and second arm 48 are in the second position, second arm 48 extends at an angle 242 of approximately fifteen degrees above horizontal on another side of first clevis 96 as shown in FIG. 6. Thus, in preferred embodiments, second clevis 98 and second arm 48 are pivotable about main pivot axis 54 relative to first clevis 96 and first arm 46 through a range of motion of approximately two-hundred-ten degrees.

As second clevis 98 and second arm 48 move between the first and second positions, link 146 moves through gap 130 between pivot pins 128. When second clevis 98 and second arm 48 are aligned vertically with first clevis 96 and first arm 46, link 146 is positioned to lie in gap 130 between pivot pins 128. By having pivot pin 160 and the associated link pivot axis 162 vertically above pivot pins 128 and the associated main pivot axis 54, longitudinal axis 183 of rod 148 extends through both pivot axis 160 and pivot axis 54 when second clevis 98 and second arm 48 are in a vertical position aligned with first clevis 96 and first arm 46. In addition, by having pivot pin 160 and the associated link pivot axis 162 vertically above pivot pins 128 and the associated main pivot axis 54, spring 150 of counterbalancing assembly 140 exerts a substantially equivalent amount of force on rod 148 and link 146 when second clevis 98 and second arm 48 are moved from the vertical position by similar amounts either in direction 238 toward the first position or in direction 240 toward the second position.

In preferred embodiments, counterbalancing assembly 140 operates to counterbalance surgical lighthead 36 and other components of surgical light apparatus 30 associated with surgical lighthead 36 when second arm 48 and second clevis 98 are at any position between the first and second positions. In addition, in preferred embodiments, longitudinal axis 183 of rod 148 and axis 58, about which lighthead 36 pivots relative to yoke 50, intersect at the center of gravity (not shown) of surgical lighthead 36. By having axis 183 intersecting with axis 58 at the center of gravity of lighthead 36, the moment created by lighthead 36 and yoke 50 about main pivot axis 54, when second arm 48 and second clevis 98 are stationary in any particular position between the first and second positions, is substantially constant independent of the position of yoke 50 relative to second arm 48 and independent of the position of lighthead 36 relative to yoke 50. If the center of gravity of lighthead 36 is offset from either of axes 58, 183 by a slight amount, friction that is inherently present between moving components of arm assembly 32 assists counterbalancing assembly 140 to compensate for this offset so that lighthead 36 and other components of surgical light apparatus 30 associated with lighthead 36 still remain counterbalanced.

While arm assembly 32 can support any object of interest having a weight within limits dictated by counterbalancing assembly 140, it is anticipated that most users of arm assembly 32 will use arm assembly 32 to support a surgical lighthead. Thus, the meaning of the word "surgical lighthead" or "lighthead" as used in this specification and in the claims should be taken to include any object that is carried by arm assembly 32 either with or without yoke 50.

Figure 7:
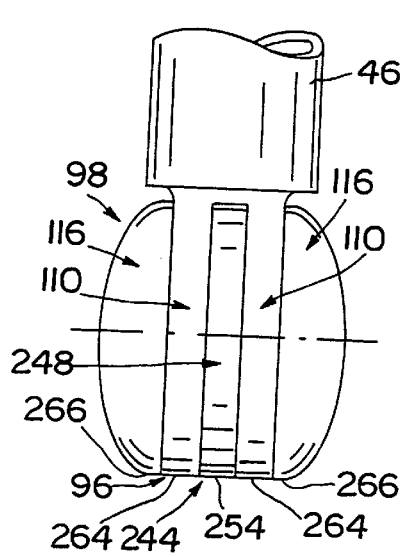
FIG. 7 is a rear view of the arm mechanism of FIG. 6 showing a pair of flanges of the first clevis positioned to lie between a pair of flanges of the second clevis and showing a space filler positioned to lie between the pair of flanges of the first clevis.
Figure 8:
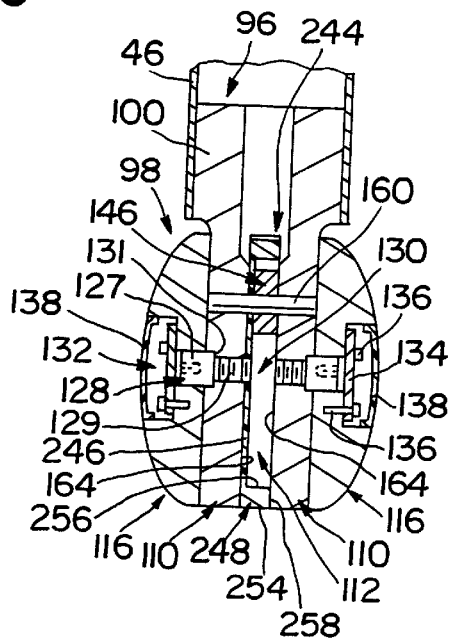
FIG. 8 is a sectional view of the arm mechanism of FIG. 6, taken along line 8—8, showing the link of the counterbalancing assembly pinned to the flanges of the first clevis above the pair of pivot pins coupling the second clevis to the first clevis.
Figure 9:
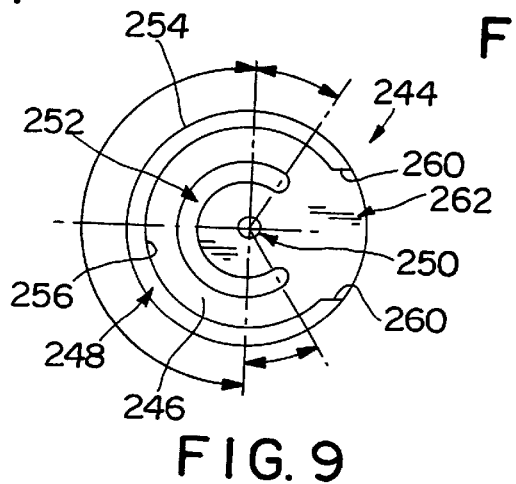
FIG. 9 is a side elevation view of the space filler showing an arcuate slot and a central aperture formed in a thin wall of the space filler and showing an arcuate rim of the space filler appended to an outer periphery of the thin wall.

Arm assembly 32 includes a clevis cover or space filler 244 as shown in FIGS. 2 and 7–9. Space filler 244 includes a circular thin wall portion 246 and an arcuate rim 248 appended to the outer periphery of thin wall portion 246. Thin wall portion 246 is formed to include a central aperture 250 and an arcuate slot 252. Rim 248 and slot 252 are substantially concentric with central aperture 250 and slot 252 is positioned to lie between aperture 250 and rim 248 as shown best in FIG. 9. Rim 248 includes an outer circumferential edge 254 and an inner circumferential edge 256. In addition, rim 248 includes an arcuate surface 258 that extends between circumferential edges 254, 256 and that is spaced apart from and parallel with thin wall portion 246. Rim 248 further includes a pair of end edges 260 defining a link-receiving gap 262 therebetween as shown in FIGS. 2 and 9.

Space filler 244 is positioned to lie in space 112 between flanges 110 of first clevis 96 so that thin wall portion 246 is adjacent to inner face 164 of one of flanges 110 with a minimal amount of clearance therebetween and so that arcuate surface 258 of rim 248 is adjacent to the inner face 164 of the other of flanges 110 with a minimal amount of clearance therebetween as shown in FIG. 8. In addition, threaded portion 129 of one of pivot pins 128 is received in central aperture 250 of thin wall portion 248 so that space filler 244 is supported for pivoting movement about main pivot axis 54 relative to the flanges 110 of first clevis 96.

Each of flanges 110 of first clevis 96 includes an outer circumferential edge 264 and each of flanges 116 of second clevis 98 includes an outer circumferential edge 266 as shown, for example, in FIG. 7. Circumferential edge 254 of rim 248 and circumferential edges 264, 266 of first and second clevises 96, 98 have substantially equivalent diameters. Thus, edge 254 of space filler 244 substantially spans space 112 between flanges 110 of first clevis 96 and edges 264 of flanges 110 cooperate with edge 254 of space filler 244 to substantially span space 118 between flanges 116 of second clevis 98. By configuring arm assembly 32 such that space 112 is spanned by rim 248 of space filler 244 and such that space 118 is spanned by rim 248 of space filler 244 and flanges 110 of first clevis 96, contamination is blocked from reaching space 112 and space 118.

Pin 160, which pivotably couples link 146 to flanges 110 of first clevis 96 as previously described, extends through arcuate slot 252 formed in thin wall portion 246 of space filler 244. Thin wall portion 246 is positioned to lie between link 146 and inner face 164 of one of flanges 110 as shown in FIG. 8, and rim 248 substantially surrounds first end 156 of link 146 as shown in FIG. 6. Link 146 extends from pin 160 through link-receiving gap 262 of rim 248 and into interior region 144 of main body 114 of second clevis 98. Link 146 includes a flat edge 268 and a curved edge 270, each of which extend between first and second ends 156, 174 of link 146. Edge 270 is curved primarily to provide more room in space 112 between flanges 110 and interior region 144 of second clevis 98 for electrical wires (not shown) that are routed through arm mechanism 32 and yoke 50 to lighthead 36.

As second clevis 98 and second arm 48 pivot in directions 238, 240 between the first and second positions, one of edges 268, 270 engages a respective one of edges 260 of rim 248 to cause space filler 244 to pivot about main pivot axis 54 relative to flanges 110 of first clevis 96. Space filler 244 is configured so that link-receiving space 262 remains aligned with interior region 144 of second clevis 98 during movement of second clevis 98 and second arm 48 between the first and second positions. When the direction of pivoting movement of second clevis 98 and second arm 48 is reversed, link 146 separates away from one of edges 260 of rim 248 and moves toward the other of edges 260 of rim 248 and space filler 244 remains stationary relative to first clevis 96 until link 146 comes into contact with the other of edges 260 at which point space filler 244 pivots with second clevis 98 and second arm 48 relative to first clevis 96. However, because engagement between link 146 and space filler 244 causes space filler 244 to pivot about main pivot axis 54 during pivoting movement of second clevis 98 and second arm 48, space filler 244 pivots about main pivot axis 54 at a different rate than second clevis 98 and second arm 48.

Figure 10:
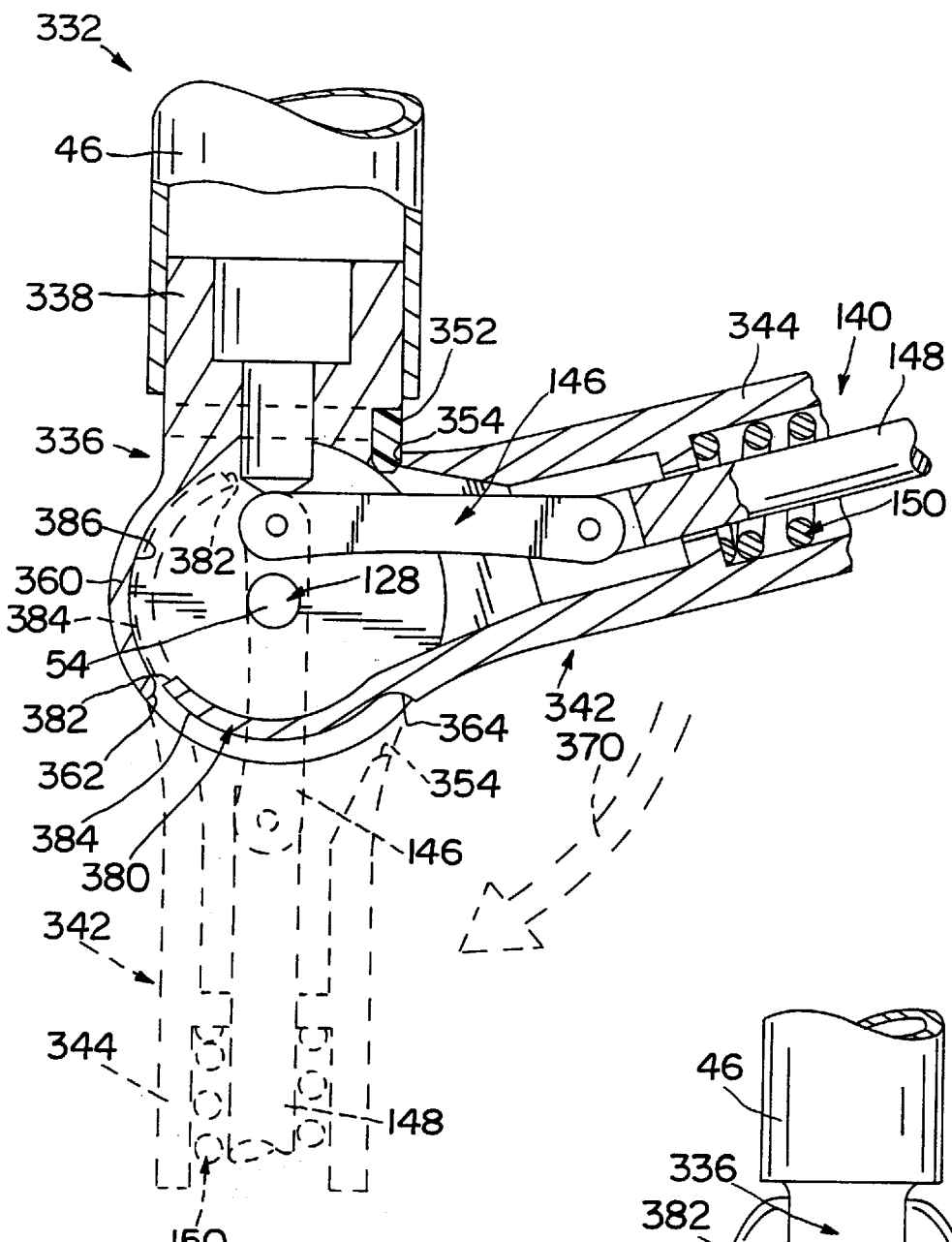
FIG. 10 is side elevation view of a portion of an alternative embodiment arm mechanism in accordance with the present invention, with portions broken away, showing a second clevis of the alternative embodiment arm mechanism in a raised or first position (in solid) in which a stop edge of the second clevis engages an associated stop member of a first clevis of the alternative embodiment arm mechanism, and the second clevis being pivotable from the raised position in a clockwise direction (indicated by the phantom double arrow) into a lowered or second position (in phantom) in which another stop edge of the second clevis engages an associated stop edge of the first clevis.
Figure 11:
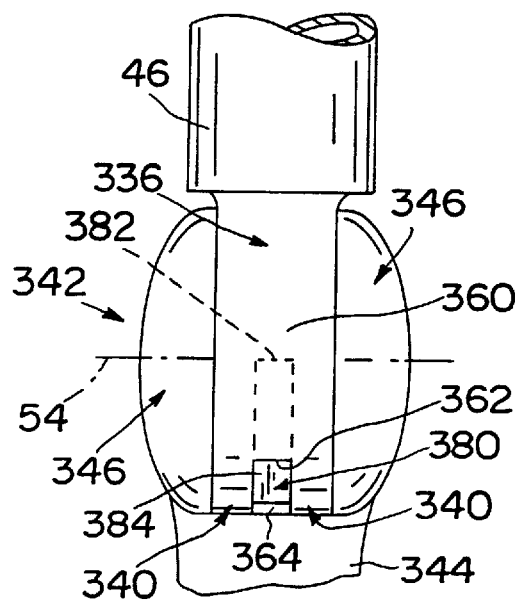
FIG. 11 is a rear view of a portion of the alternative embodiment arm mechanism of FIG. 10 showing the second clevis in an intermediate position between the raised and lowered positions.

An alternative embodiment arm mechanism 332 which is similar to arm mechanism 32 is shown in FIGS. 10 and 11. Many of the components of arm mechanism 332 are substantially similar to corresponding components of arm mechanism 32 and, therefore, are indicated with like reference numerals. For example, arm mechanism 332 includes a counterbalancing assembly 140 having a link 146, a rod 148, and a spring 150. Arm mechanism 332 includes a first clevis 336 having a main body 338 and a pair of flanges 340 extending from main body 338. Main body 338 of first clevis 336 is attached or otherwise appended to first arm 46 as shown in FIG. 10. Arm mechanism 332 includes a second clevis 342 having a main body 344 and a pair of flanges 346 extending therefrom. Second clevis 342 is pivotably coupled to first clevis 336 by a pair of pivot pins 128 in substantially the same manner that second clevis 98 is pivotably coupled to first clevis 96.

The main difference between arm mechanism 32 and arm mechanism 332 is that arm mechanism 32 is configured so that second clevis 98 and second arm 48 are able to pivot through a range of motion that exceeds one-hundred-eighty degrees as previously described, whereas arm mechanism 332 is configured so that second clevis 342 and the associated second arm (not shown) are able to pivot through a range of motion of approximately one-hundred-five degrees, as shown in FIG. 10. First clevis 336 includes a stop member 350 that is attached or otherwise adhered to main body 338 thereof as shown in FIG. 10. Stop member 350 includes a stop surface 352 and second clevis 342 includes a stop surface 354 that engages stop surface 352 when second clevis 342 and the associated second arm are in a raised or first position as also shown in FIG. 10 (in solid).

First clevis 336 includes an amount of bridging material 360 that is appended to a portion of the outer periphery of each of flanges 340 of first clevis 336 as shown in FIG. 10, and that spans the space between flanges 340 of first clevis 336 as shown in FIG. 11. Bridging material 360 includes a stop surface 362 at the lower end thereof as shown in FIGS. 10 and 11. Second clevis 342 includes a stop surface 364 that engages stop surface 362 when second clevis 342 and the associated second arm are in a second, substantially vertical or lowered position as shown in FIG. 10 (in phantom). When second clevis 342 is moved from the first position to the second position in the direction of phantom arrow 370, shown in FIG. 10, link 146 moves into a gap defined between pivot pins 128.

Second clevis 342 is formed to include an arcuate filler arm 380 that extends from main body 344 into the space defined between flanges 340 of first clevis 336 as shown best in FIG. 10. Filler arm 380 spans the space between flanges 340 thereby to block contamination from reaching the space between flanges 340 and the interior regions of first and second clevises 336, 342. Filler arm 380 includes a distal end surface 382 that is positioned to lie adjacent to stop surface 362 of bridging material 360 when second clevis 342 and the second arm associated therewith are in the first position as shown in FIG. 10 (in solid). Filler arm 380 includes an arcuate outer surface 384 and bridging material 360 includes an arcuate inner surface 386. Outer surface 384 of filler arm 380 confronts inner surface 386 of bridging material 360 with a minimal amount of clearance therebetween when second clevis 342 and the associated second arm are in the second position as shown in FIG. 10 (in phantom).

Figure 14:
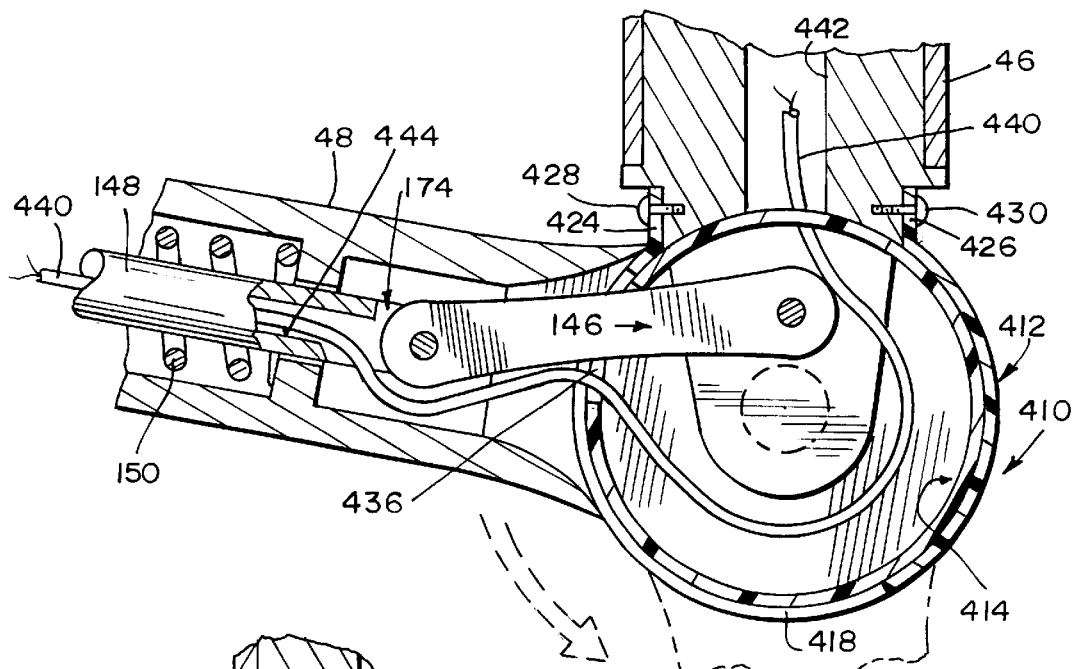
FIG. 14 is a sectional view taken through the support arm of FIG. 12 with the first and second arms in a first orientation.

Another embodiment of the present invention is illustrated in FIGS. 12–14. Those numbers referenced by numbers in FIGS. 1–11 perform the same or similar function. In the embodiment of FIGS. 12–14, a first clevis 396 includes spaced apart flanges 398 having outer side faces 400 and inner side faces 402. Flanges 398 extend away from a main body 402 having recessed portions 404 located above a space 406 formed between inner side faces 402 of flanges 398. Threaded apertures 408 are formed within recessed portions 404 on opposite sides of the main body 402.

A clevis cover or space filler 410 includes an outer cover 412 and an inner cover 414. Outer cover 412 includes an arcuate body portion 416 having an elongated slot 418. Tabs 420 and 422 are located opposite ends of the body portion 416. Tabs 420 and 422 are formed to include apertures 424 and 426, respectively. Outer cover 412 is configured to be secured to the body portion 402 of clevis 396 by suitable fasteners 428 and 430 which extend through apertures 424 and 426, respectively, and into the threaded apertures 408 on the body portion 402.

Inner cover 414 is illustratively a floating cover which is not rigidly secured to either first clevis 396 or second clevis 98. Inner cover 414 is illustratively a continuous ring having a first portion 432 with a larger width then a second portion 434. A slot 436 is formed in the first portion 432. The wider first portion 432 is configured to keep the inner cover 414 from twisting as it rotates between the inner side faces 122 of second clevis 98. The thinner second portion 434 is located within space 406 defined by inner side faces 402 of clevis 396.

Figure 15:
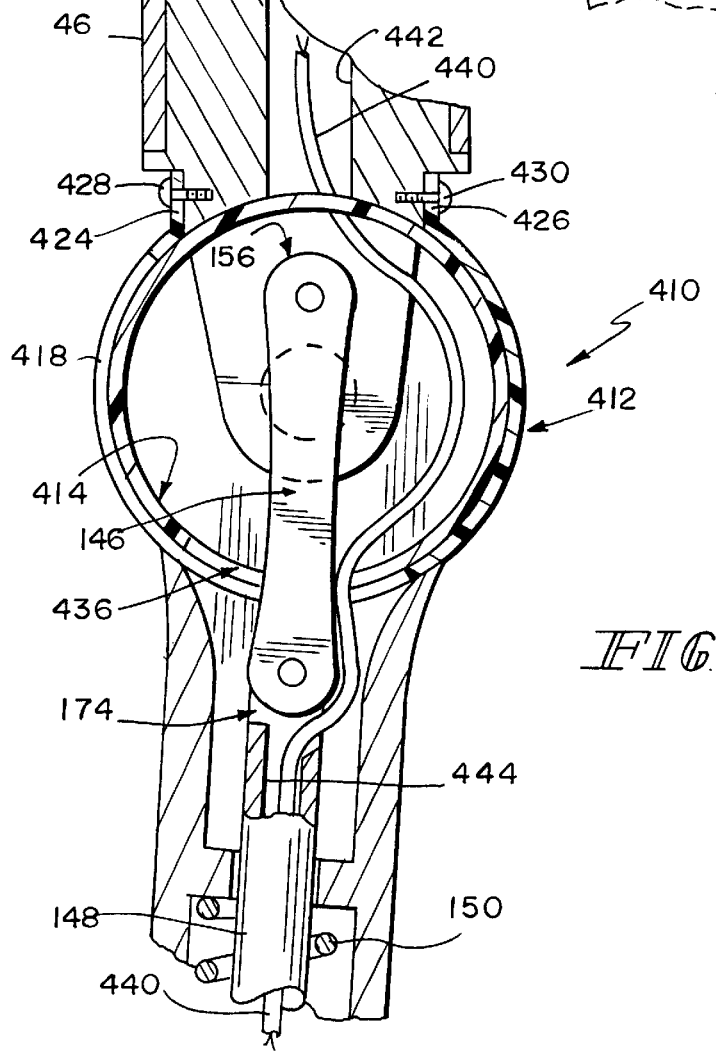
FIG. 15 is a sectional view similar to FIG. 14 illustrating the first and second arms in a second orientation.

As best shown in FIG. 13, the first end 156 of link 146 extends through the slot 418 and outer cover 412 and then through the slot 436 in inner cover 414. The thin second portion 434 of inner cover 414 permits a wire 440 to be routed through a center aperture 442 in the first arm 46 past the thin second portion 434 of inner cover 414 and then through slots 436 and 418 into the second arm 48 as shown in FIGS. 14 and 15. The wire 440 is routed past the second end 174 of link 146 and into an opening 444 formed in tube 148. FIGS. 14 and 15 also illustrate movement of the inner cover as the first and second arms 46 and 48 are pivoted. The inner cover 414 is free floating with the link 146. As the inner cover 414 rotates, the first and second portions 432 and 434 of inner cover 414 are aligned with slot 418 and outer cover 412 so that the inner cover 414 blocks the gap created by the slot 414 of the outer cover 412.

Although the invention has been described in detail with reference to certain illustrated embodiments, variations and modifications exist within the scope and spirit of the invention as described and defined in the following claims.

What is claimed is:

1. An arm assembly for supporting a surgical lighthead of a surgical light apparatus, the arm assembly comprising:
    a first arm,
    a first clevis appended to the first arm and having a pair of first flanges that are separated to define a first space therebetween,
    a second arm;
    a structure coupling the surgical lighthead to the second arm,
    a second clevis appended to the second arm and having a pair of second flanges that are separated to define a second space therebetween, at least a portion of the pair of first flanges being positioned to lie in the second space such that each first flange is adjacent to a respective one of the second flanges, the second flanges being pivotably coupled to respective first flanges so that the second arm and second clevis are pivotable about a main pivot axis relative to the first arm and first clevis, and
    a space filler including an outer cover rigidly coupled to the first clevis, the outer cover being formed to include an elongated arcuate slot configured to receive a member coupled to the second arm therethrough, the space filler also including an inner cover located in the first space, the inner cover being configured to move freely relative to the first clevis, the second clevis and the outer cover as the first and second arms move relative to each other.

2. The arm assembly of claim 1, wherein the second arm is formed to include an interior region, and further comprising a rod extending within the interior region of the second arm, a link coupled to the rod and having a portion positioned to lie in the first space and pivotably coupled to the first clevis for pivoting movement about a link pivot axis that is spaced apart from the main pivot axis, and a spring extending within the interior region of the second arm, the spring exerting a force on the rod and the link to counterbalance the surgical lighthead.

3. The arm assembly of claim 2, wherein the link is the member which extends through the elongated slot formed in the outer cover so that an end of the link is located in the first space.

4. The arm assembly of claim 3, wherein the inner cover is also formed to include a slot configured to receive the link therethrough.

5. The arm assembly of claim 4, wherein the inner cover is a ring having a first portion and a second portion narrower than the first portion, the slot being formed in the first portion of the inner cover.

6. The arm assembly of claim 1, wherein the inner cover is a ring having a first portion and a second portion narrower than the first portion.

7. The arm assembly of claim 6, wherein the first portion of the inner cover has a width substantially equal to a width of the second space.

8. The arm assembly of claim 6, wherein the second portion of the inner cover has a width substantially equal to a width of the first space.

9. An arm assembly for supporting a surgical lighthead of a surgical light apparatus, the arm assembly comprising
    a first arm including a first stop surface and a second stop surface,
    a second arm formed to include an interior region, the surgical lighthead being supported by the second arm, the second arm including a third stop surface and a fourth stop surface, the second arm being pivotally coupled to the first arm about a main pivot axis,
    a rod extending within the interior region of the second arm,
    a link coupled to the rod and pivotably coupled to the first arm for pivoting movement about a link pivot axis that is spaced apart from the main pivot axis,
    a spring extending within the interior region of the second arm, the spring exerting a force on the rod and the link to counterbalance the surgical lighthead, and
    wherein the second arm is pivotable about the main pivot axis relative to the first arm between a first position in which the third stop surface engages the first stop surface to limit pivoting movement of the second arm in a first direction and a second position in which the fourth stop surface engages the second stop surface to limit pivoting movement of the second arm in a second direction.

10. The arm assembly of claim 9, wherein the first, second, third, and fourth stop surfaces are configured so that the second arm pivots through an angle of at least one-hundred-eighty degrees about the main pivot axis relative to the first arm during movement of the second arm between the first and second positions.

11. The arm assembly of claim 9, wherein the link pivot axis is vertically above the main pivot axis.

12. The arm assembly of claim 9, wherein the first arm, the second arm, the link, and the rod are substantially vertically aligned with one another when the second arm is in the second position.

13. The arm assembly of claim 9, wherein the first and third stop surfaces are configured so that the second arm and the first arm define an acute included angle therebetween when the second arm is in the first position, and the second and fourth stop surfaces are configured so that the second arm and first arm define an angle of about one-hundred-eighty degrees therebetween when the second arm is in the second position.

14. The arm assembly of claim 13, wherein the first arm, the second arm, the link, and the rod are substantially vertically aligned with one another when the second arm is in the second position.

15. An arm assembly for supporting a surgical lighthead of a surgical light apparatus, the arm assembly comprising
    a first arm,
    a second arm formed to include an interior region, the surgical lighthead being supported by the second arm, the second arm being pivotally coupled to the first arm about a main pivot axis,
    a rod extending within the interior region of the second arm and having spaced apart first and second ends,
    a link pivotably coupled to the rod adjacent to the first end thereof, the link having a portion pivotably coupled to the first arm for pivoting movement about a link pivot axis that is spaced apart from the main pivot axis, a spring extending within the interior region of the second arm, and an adjuster movably coupled to the rod, the adjuster including a rod-engaging portion and a spring-engaging portion, the spring being compressed between the spring-engaging portion and a portion of the second arm so as to exert a force on the rod and the link to counterbalance the surgical lighthead, the rod-engaging portion having a first end face facing toward said portion of the second arm, the spring-engaging portion having a second end face facing away from said portion of the second arm, the adjuster being movable relative to the rod between first and second positions to adjust compression of the spring, and the second end of the rod being positioned to lie between the first and second end faces of the adjuster when the adjuster is in any position between the first and second positions.

16. The arm assembly of claim 15, wherein the rod-engaging portion of the adjuster is somewhat cylindrical and the spring-engaging portion extends radially outwardly from the rod-engaging portion.

17. The arm assembly of claim 15, wherein the spring is a coil spring having an interior region, the rod extends within the interior region of the coil spring, and the rod-engaging portion of the adjuster is positioned to lie within the interior region of the coil spring.

18. The arm assembly of claim 5, wherein the rod-engaging portion of the adjuster includes a first cylindrical outer surface having a first diameter and the spring-engaging portion of the adjuster includes a second cylindrical outer surface having a second diameter that is larger than the first diameter.

19. The arm assembly of claim 18, wherein the second outer surface is formed to include a plurality of radially extending holes and the second arm is formed to include a window through which the holes are accessed with an adjustment tool to adjust the position of the adjuster relative to the rod between the first and second positions.

20. An arm assembly for supporting a surgical lighthead of a surgical light apparatus, the arm assembly comprising a first arm having a pair of first flanges that are separated to define a first space therebetween, a second arm formed to include an interior region and coupled to the surgical lighthead, the second arm having a pair of second flanges that are separated to define a second space therebetween, at least a portion of the pair of first flanges being positioned to lie in the second space such that each first flange is adjacent to a respective one of the second flanges, the second flanges being pivotably coupled to respective first flanges so that the second arm is pivotable about a main pivot axis relative to the first arm, a rod extending within the interior region of the second arm, a link coupled to the rod and having a portion positioned to lie in the first space and pivotably coupled to the first arm for pivoting movement about a link pivot axis that is spaced apart from the main pivot axis, a spring extending within the interior region of the second arm, the spring exerting a force on the rod and the link to counterbalance the surgical lighthead, and a space filler positioned to lie in the first space, each first flange having a first edge, each second flange having a second edge, and the space filler having a third edge, the third edge substantially spanning the first space between the first flanges, and the third edge cooperating with the first edges to substantially span the second space between the second flanges.

21. The arm assembly of claim 20, wherein the first, second, and third edges are substantially concentric with the main pivot axis and have substantially equivalent diameters.

22. The arm assembly of claim 20, wherein the space filler includes a rim providing the third edge, the space filler includes a thin wall appended to the rim.

23. The arm assembly of claim 22, wherein the thin wall is formed to include an arcuate slot, and further comprising a link pin pivotably coupling the link to at least one of the first flanges, the link pin being received in the arcuate slot.

24. The arm assembly of claim 23, wherein the thin wall is formed to include a central aperture, and one of a pair of pivot pins coupling a respective one of the first flanges with a respective one of the second flanges is received in the central aperture so that the space filler is supported for pivoting movement about the main pivot axis relative to the first flanges.

25. The arm assembly of claim 20, wherein the third edge is formed to include a link-receiving gap and the link extends through the link-receiving gap.

26. An arm assembly for supporting a surgical lighthead of a surgical light apparatus, the arm assembly comprising a first arm, a second arm formed to include an interior region and coupled to the surgical lighthead, the second arm being pivotally coupled to the first arm about a main pivot axis, a rod extending within the interior region of the second arm, a link coupled to the rod and pivotably coupled to the first arm for pivoting movement about a link pivot axis that is spaced apart from the main pivot axis, a spring extending within the interior region of the second arm, the spring exerting a force on the rod and the link to counterbalance the surgical lighthead, and a space filler including an outer cover coupled to the first arm and formed to include a first slot and an inner cover nested within the outer cover and formed to include a second slot, the link extending through the first and second slots, the link being configured to move about the link pivot axis in response to movement of the second arm about the main pivot axis to cause the inner cover to rotate about an axis of rotation.

27. An arm assembly for supporting a surgical lighthead of a surgical light apparatus, the arm assembly comprising a first arm having a pair of first flanges that are separated to define a first space therebetween, a second arm coupled to the surgical lighthead, the second arm having a pair of second flanges that are separated to define a second space therebetween, at least a portion of the pair of first flanges being positioned to lie in the second space such that each first flange is adjacent to a respective one of the second flanges, the second flanges being pivotably coupled to respective first flanges so that the second arm is pivotable about a main pivot axis relative to the first arm, a counterbalancing device positioned to lie in the first space, and a space filler positioned to lie in the first space, each first flange having a first edge, each second flange having a second edge, and the space filler having a third edge, the third edge substantially spanning the first space between the first flanges, and the third edge cooperating with the first edges to substantially span the second space between the second flanges.

28. The arm assembly of claim 27, wherein the second arm includes an interior region, and wherein the counterbalancing device includes a rod extending within the interior region of the second arm, a link coupled to the rod and having a portion positioned to lie in the first space and pivotably coupled to the first arm for pivoting movement about a link pivot axis that is spaced apart from the main pivot axis, and a spring extending within the interior region of the second arm to exert a force on the rod and the link to counterbalance the surgical lighthead.

29. An arm assembly for supporting a surgical lighthead of a surgical light apparatus, the arm assembly comprising:

a first arm having a pair of first flanges that are separated to define a first space therebetween, a second arm coupled to the surgical lighthead, the second arm having a pair of second flanges that are separated to define a second space therebetween, at least a portion of the pair of first flanges being positioned to lie in the second space such that each first flange is adjacent to a respective one of the second flanges, the second flanges being pivotably coupled to respective first flanges so that the second arm is pivotable about a main pivot axis relative to the first arm, and a space filler including an outer cover rigidly coupled to the first arm and located in the first space, the outer cover being formed to include an elongated arcuate slot configured to receive a member coupled to the second arm, the space filler also including an inner cover located in the first space, the inner cover being configured to move freely relative to the first arm, the second clevis and the outer cover as the first and second arms move relative to each other.

30. An arm assembly for supporting a surgical lighthead of a surgical light apparatus, the arm assembly comprising a first arm having a pair of first flanges that are separated to define a first space therebetween, a second arm formed to include an interior region and coupled to the surgical lighthead, the second arm having a pair of second flanges that are separated to define a second space therebetween, at least a portion of the pair of first flanges being positioned to lie in the second space such that each first flange is adjacent to a respective one of the second flanges, the second flanges being pivotably coupled to respective first flanges so that the second arm is pivotable about a main pivot axis relative to the first arm, a rod extending within the interior region of the second arm, a link coupled to the rod and having a portion positioned to lie in the first space and pivotably coupled to the first arm for pivoting movement about a link pivot axis that is spaced apart from the main pivot axis, a spring extending within the interior region of the second arm, the spring exerting a force on the rod and the link to counterbalance the surgical lighthead, and a space filler including an outer cover rigidly coupled to the first arm and located in the first space, the outer cover being formed to include an elongated arcuate slot configured to receive the rod coupled to the second arm, the space filler also including an inner cover located in the first place, the inner cover being configured to move freely relative to the first arm, the second arm and the outer as the first and second arms move relative to the first arm, the second arm and the outer cover as the first and second arms move relative to each other.

31. The arm assembly of claim 26, wherein the inner cover is spaced apart from the rod.

32. The arm assembly of claim 26, wherein the first arm includes a pair of first flanges that are separated to define a first space therebetween, the second arm includes a pair of second flanges that arc separated to define a second space therebetween, at least a portion of the pair of first flanges is positioned to lie in the second space, each of the second flanges is pivotably coupled to one of the first flanges so that the second arm is pivotable about the main pivot axis, and at least a portion of the inner cover is positioned to lie in the first space.

33. The arm assembly of claim 32, wherein at least a portion of the outer cover and at least a portion of the inner cover are positioned to lie in the second space.

34. The arm assembly of claim 32, wherein the outer cover contacts the inner cover.

35. The arm assembly of claim 32, wherein the inner cover includes a first portion having a first width and a second portion that is coupled to the first portion and has a second width that is less than the first width, the first portion is positioned to lie outside of the first space, and the second portion is positioned to lie in the first space.

36. The arm assembly of claim 26, wherein the inner cover includes a continuous ring formed to include the second slot.

37. The arm assembly of claim 36, wherein the ring includes a first portion having a first width and a second portion having a second width that is less than the first width and the first portion is formed to include the second slot.

38. The arm assembly of claim 36, wherein the outer cover includes an arcuate body portion formed to include the first slot and the ring contacts the arcuate body portion.

39. The arm assembly of claim 26, wherein the axis of rotation of the inner cover is coincident with the main pivot axis so that the inner cover is configured to rotate about the main pivot axis.

* * * * *